Nov. 8, 1966   H. L. DETRICK   3,284,119
SPRING MEANS FOR SECURING SCREEN LAYERS TOGETHER
Filed April 19, 1963

INVENTOR.
HAROLD L. DETRICK
BY Naylor & Neal
ATTORNEYS

United States Patent Office 3,284,119
Patented Nov. 8, 1966

3,284,119
SPRING MEANS FOR SECURING SCREEN
LAYERS TOGETHER
Harold L. Detrick, Box 258, Montara, Calif.
Filed Apr. 19, 1963, Ser. No. 274,207
6 Claims. (Cl. 287—189.36)

This invention relates to spring means for securing screen layers together and more particularly to such spring means which is useful in the fabrication of animal cages and the like.

In my Patent No. 2,970,566, there is disclosed a wire cage for mink, and it is an object of this invention to provide spring attachment means for securing together screen layers and particularly the wire mesh components of the mink cages shown in my patent.

It is another object of the invention to provide such spring attachment means by which layers of wire mesh may be attached together very easily and securely while permitting the layers to be separated easily when desired as where one of the layers may be the door of an animal cage.

It is another object of the invention to provide such spring attachment means which will maintain secure attachment between layers of wire mesh when the layers are subjected to relatively large forces tending to move them with respect to each other and particularly the forces to which the components of a mink cage are subjected when a mink crawls over all of the interior walls of the cage.

It is another object of the invention to provide such attachment means which may be used on mink cages and manipulated very easily from the outside of the cage yet which is not easily released by a mink inside the cage.

Other objects and advantages of the invention will become apparent from the following description read in conjunction with the attached drawings in which.

Figure 1:
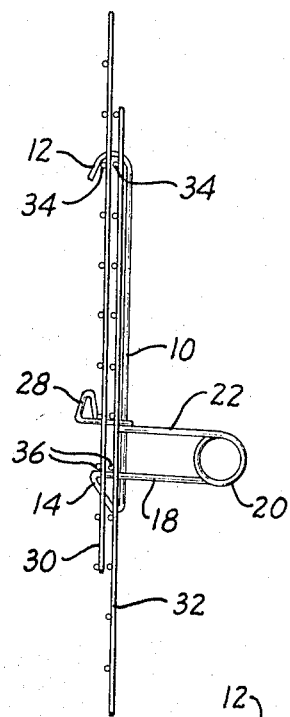
FIG. 1 is a view in elevation of spring attachment means constructed in accordance with this invention and securing two layers of wire mesh together.

Referring now in detail to the drawings, the spring attachment means shown therein is made from a single strand of resilient material such as wire and comprises an elongated shaft portion 10 which is bent to an acute angle at its upper end to form a hook portion 12 thereon with the wire at the lower end being bent through a shoulder portion 14 on the same side of the shaft portion 10 as the hook portion 12 and having a shoulder surface 16 thereon lying generally perpendicular to the shaft portion 10 and facing toward the hook portion 12.

From the shoulder portion 14, the strand extends along a leg 18, around a resilient loop 20, hence along a leg 22, around the shaft portion 10 at a small loop 26 and terminates in a second hook portion 28 on the same side of the shaft portion 10 as the loop and shoulder portions 12 and 14. The hook portion 28 is movable toward the shoulder portion 14 in opposition to the resiliency of the loop 20, and the loop 26 is formed with a slightly larger diameter than the shaft portion 10 to facilitate this movement.

Figure 2:
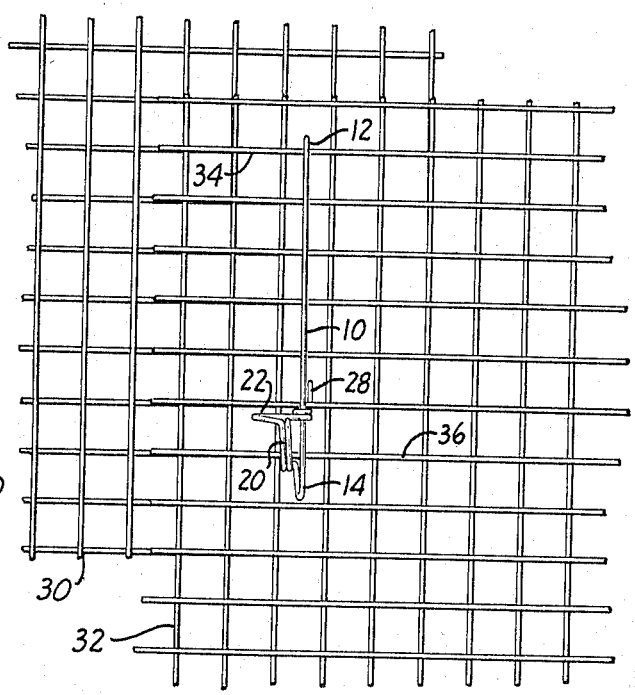
FIG. 2 is a view in elevation of the apparatus of FIG. 1 taken perpendicular to the plane of FIG. 1.
Figure 3:
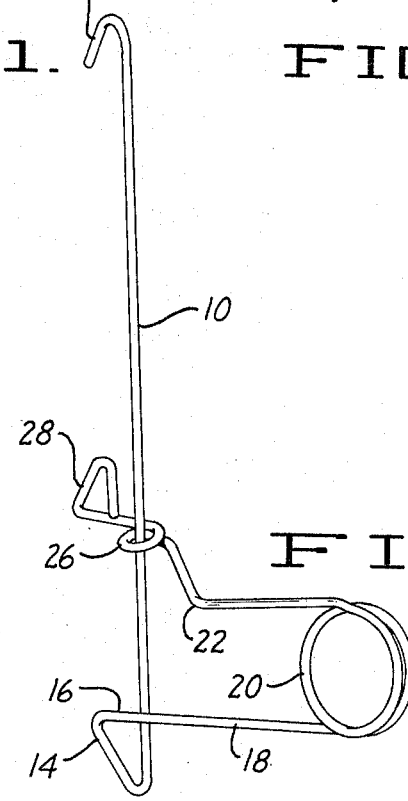
FIG. 3 is an enlarged perspective view of the clip shown in FIGS. 1 and 2.

This spring clip is employed for attaching together layers of wire mesh or screen as illustrated in FIGS. 1 and 2. Thus, two pieces of screen 30 and 32 overlap each other in an area where upper wires 34 and lower wires 36 in the two pieces of screen are adjacent to each other. The spring clip is inserted in place by first inserting the hook portion 12 thereof through the two pieces of screen and hooking it onto the upper pair of wires 34. The movable hook 28 is then moved toward the shoulder portion 14 against the resiliency of loop 20, and the hook 28 and shoulder portion 14 are inserted through the layers of screen above and below respectively the pair of wires 36 with the shoulder surface 16 of the shoulder 14 thereby engaging the underside of the wires 36. Thereafter, the movable hook 28 is released so that resiliency of the loop 20 moves it upwardly to its position shown in FIG. 1 where it engages the piece of screen 30 and holds the shaft portion 10 against the piece of screen 32 thereby maintaining the shoulder portion 14 in engagement with the wires 36. With the spring clip attached in this manner, the two pieces of screen 30 and 32 are connected together substantially rigidly. Relative forces applied to the two pieces of screen to move them parallel to each other are apposed by engagement of the hook 12 and shoulder 14 with the wires 34 and 36 respectively while forces tending to move the two pieces of screen apart from each other perpendicular to their faces are opposed by engagement of the hook portion 12 with the two wires 34 and by gripping of the two pieces of screen between the hook 28 and shaft portion 10.

The spring clip may be removed very easily to separate the two screens 30 and 32 by moving the two legs 18 and 22 toward each other and withdrawing the hook 28 and shoulder 18 from the screens.

While one specific embodiment of the invention has been illustrated and described in detail herein, it is obvious that many modifications thereof may be made without departing from the spirit and scope of the invention.

I claim:
1. A clip for locking together pieces of wire mesh which comprises a shaft portion, a hook portion at one end of said shaft portion and forming with said shaft portion an acute angle, a shoulder portion on said shaft portion on the same side thereof as said hook portion and remote from said hook portion and having a shoulder surface thereon generally perpendicular to said shaft portion and facing in a direction longitudinally of said shaft portion opposite to the direction in which said acute angle faces, and releasable latch means movable longitudinally of said shaft portion on the same side of said hook as said shoulder portion and having a second hook portion on the same side of said shaft portion as said first hook portion and said shoulder portion for engaging a piece of wire mesh which said first hook and shoulder portions penetrate and holding said shoulder portion in said piece of mesh.

2. A spring clip for locking together pieces of wire mesh which comprises a continuous strand of resilient material having a shaft portion, a hook portion integrally formed with said shaft portion adjacent to one end of said shaft portion and forming with said shaft portion an acute angle, a shoulder portion integrally formed on said shaft portion on the same side of said shaft portion as said hook portion and having a shoulder surface thereon generally perpendicular to said shaft portion and facing in a direction longitudinally of said shaft portion opposite to the direction in which said acute angle faces, and a second hook portion on the same side of said shaft portion as said first hook and shoulder portions and resiliently connected to said shaft portion for resilient longitudinal movement with respect to said shaft portion.

3. The spring clip of claim 2 in which said strand extends continuously from said shoulder portion around a resilient loop on the side of said shaft portion opposite to said hook and shoulder portions and hence to said second hook portion.

4. The spring clip of claim 3 in which said strand is slidably wrapped around said shaft portion at a position between said resilient loop and said second hook portion.

5. A spring clip for locking together pieces of wire mesh comprising an integral strand of resilient material having an elongated shaft portion adapted to extend parallel to a piece of mesh and having a hook portion integrally formed thereon, and a resilient loop extending from said shaft portion on the opposite side from said hook portion with said loop terminating in a strand having an intermediate portion slidably wrapped around said shaft portion and a terminal portion defining a second hook portion on the same side of said wire as said first hook portion and on the opposite side of said wire from said loop with said first and second hook portions facing in opposite directions parallel to said shaft portion whereby said clip may be attached to a piece of wire mesh with each of said hook portions urging the other hook portion into engagement with said mesh responsive to the resiliency of said loop.

6. A releasable splice between pieces of wire mesh which comprises: a pair of overlapping pieces of wire mesh of substantially the same mesh size and containing two pairs of adjacent wires with each pair of adjacent wires containing a wire from each piece of mesh and a continuous strand of resilient material having a shaft portion extending along one side of the area where said pieces of mesh overlap; a hook portion integrally formed with said shaft portion adjacent to one end of said shaft portion with said hook portion defining with said shaft portion an acute angle and extending through said pieces of mesh with one of said pairs of wires received in said acute angle; a shoulder portion integrally formed on said shaft portion and extending through said pieces of mesh with said shoulder portion having a shoulder surface thereon generally perpendicular to said shaft portion, facing in a direction longitudinally of said shaft portion opposite to the direction in which said acute angle faces, and engaging the other pair of said wires; and a second hook portion extending through said pieces of mesh and holding said shaft portion and said pieces of mesh together with said second hook portion integrally connected to said shaft portion for resilient longitudinal movement with respect to said shaft portion.

References Cited by the Examiner
FOREIGN PATENTS 560,756  9/1957  Belgium.

HARRISON R. MOSELEY, *Primary Examiner.*

A. I. BREIER, *Assistant Examiner.*